United States Patent [19]

Hammer et al.

[11] Patent Number: 4,868,696

[45] Date of Patent: Sep. 19, 1989

[54] LINEAR ACTUATOR USING A COMPOUND PARALLEL BENDABLE ELEMENT SUSPENSION SYSTEM

[75] Inventors: Robert Hammer, Brookfield Center, Conn.; Suryanarayan G. Hedge, Hollowville, N.Y.

[73] Assignee: International Business Machines Corporation, Armonk, N.Y.

[21] Appl. No.: 258,914

[22] Filed: Oct. 17, 1988

Related U.S. Application Data

[63] Continuation of Ser. No. 36,629, Apr. 10, 1987, abandoned.

[51] Int. Cl.⁴ .......................... G11B 5/55; G11B 5/54
[52] U.S. Cl. ...................................... 360/106; 360/105
[58] Field of Search ............... 360/105, 106, 109, 104, 360/97, 98, 99; 267/160, 161, 158

[56] References Cited

U.S. PATENT DOCUMENTS

| | | | |
|---|---|---|---|
| 2,753,176 | 7/1956 | List | 267/160 X |
| 2,897,484 | 7/1959 | Vogel | 340/174 |
| 3,531,126 | 9/1970 | Tsukagoshi et al. | 274/4 |
| 3,548,392 | 12/1970 | Walstrom et al. | 360/106 |
| 3,624,309 | 11/1971 | Dattilo | 179/100 |
| 3,702,192 | 11/1972 | Huber | 274/4 |
| 4,188,645 | 2/1980 | Ragle et al. | 360/75 |
| 4,280,155 | 7/1981 | Scott et al. | 360/98 |
| 4,291,350 | 9/1981 | King et al. | 360/104 |
| 4,374,402 | 2/1983 | Blessom et al. | 360/104 |
| 4,538,882 | 9/1985 | Tanaka et al. | 267/160 X |
| 4,556,924 | 12/1985 | Quist, Jr. et al. | 360/106 |
| 4,596,444 | 6/1986 | Ushida | 267/160 X |
| 4,620,253 | 10/1986 | Garwin et al. | 360/107 |
| 4,691,258 | 9/1987 | Kobayashi et al. | 360/105 X |

FOREIGN PATENT DOCUMENTS

| | | | |
|---|---|---|---|
| 0058422 | 5/1979 | Japan | 360/106 |
| 0133667 | 8/1983 | Japan | 360/99 |

OTHER PUBLICATIONS

IBM Technical Disclosure Bulletin, vol. 22, No. 7, Dec. 1979, Spatially Linear Motion Device for Printers and Scanners, Pennebaker.

Boyles, K. A. et al., "Complementary Cantilever Flexible Disk Head Suspension", *IBM Technical Disclosure Bulletin*, vol. 26, No. 2, pp. 819–820 (Jul. 1983).

Pennebaker, W. B., "The Cantilevered Compound Leaf Spring Suspension—A Device For Achieving Precise Spatially Linear Motion", *Engineering Technology*, (Jun. 8, 1978).

*Primary Examiner*—Robert S. Tupper
*Assistant Examiner*—Andrew L. Sniezek
*Attorney, Agent, or Firm*—Alexander Tognino; Marc D. Schechter

[57] ABSTRACT

An apparatus for the linear translation of read/write heads in a data recording system is disclosed herein. The apparatus comprises a compound parallel bending element suspension with a driver connected thereto. The compound parallel suspension comprises two sets of cantilevered bendable elements. One end of each bendable element is attached to a movable connector to connect the elements together. The other ends of two bendable elements are attached to a non-movable support post. The other ends of the remaining two elements are connected to the read/write head assembly and driver. The driver can be any of a number of conventional stepping and voice coil motor configurations including but not limited to friction drives, taut band drives, rack and pinion drives.

13 Claims, 7 Drawing Sheets

LINEAR ACTUATOR USING A COMPOUND PARALLEL BENDABLE ELEMENT SUSPENSION SYSTEM

This is a continuation of application Ser. No. 036,629, filed Apr. 10, 1987 now abandoned.

BACKGROUND OF THE INVENTION

1. Field of the Invention

This invention relates to the actuation of read/write heads in data storage systems. More particularly, this invention relates to the linear actuation of read/write heads in relatively high density data storage configurations by using a compound parallel bendable element suspension system and driving means assembled therewith.

2. Description of Related Art

In disk file data recording systems, linear actuation of read/write heads in the direction of the disk radius is the desired mechanism for accessing data tracks. In lower track density disk file systems, rotary actuators, which translate the read/write heads, non-linearly, through an arc are acceptable and used. In higher track density disk file systems, highly accurate, linear actuators, such as voice coil motors, are required. These highly accurate, linear actuators require elaborate bearing assemblies, guides, etc. to effect their linear motion. Heretofore, there has not been a simple, cost effective means by which highly accurate, linear track actuation has been attainable.

While simple parallel spring suspensions have been used to provide head actuation (see, for example, U.S. Pat. No. 3,531,126 issued to Tsukagoshi), these devices are known to introduce skew angle errors (rotation of the head relative to track) when used with magnetic recording heads.

For example, when a deflection force perpendicular to the leaf spring is applied to the movable head end of a parallel leaf spring suspension, skew angle errors occur because of the shortening of springs. As the movable head end is translated across the disk file, the effective length of the springs is reduced which shifts the location of the head in relation to the tracks on the disk file (see for example, U.S. Pat. Nos. 4,374,402; 4,188,645; 3,702,192; 3,634,309; and 3,531,126). These skew angle errors make simple parallel spring suspension systems unacceptable for high density recording disk files.

While compound parallel spring suspensions are known, heretofore, such spring suspensions have not been used in data storage applications. While such spring suspensions are known not to have problems with skewing, problems of accurate translation in driving the load and problems of harmonic oscillations of the suspension have caused such spring suspensions to be regarded as unsuitable for read/write head actuation disk files.

It is therefore an object of the present invention to provide for a simple, cost efficient, highly accurate linear translation device for use with high density recording disk files.

SUMMARY OF THE INVENTION

An apparatus for the linear translation of read/write heads in a data recording system is disclosed herein. The apparatus comprises a compound bendable element suspension with driving means connected thereto. The compound bendable element suspension comprises two sets of cantilevered elements. One set of said elements is attached and cantilevered from a non-moveable support post to a movable connecting means at their other end. The other set of said elements are, then, attached in common to said connecting means and cantileverly extended therefrom and matingly connected to a read/write head assembly (carrier means) and drive means at their other end.

In one embodiment, said compound bendable elements are leaf springs maintained in an upper and lower planar relationship. In said embodiment, the driving means is connected at the carrier means end of said springs. With this arrangement, the compound spring assembly can be positioned so that the tension and/or compression of the springs provides the loading force for engaging the drive means.

In a different embodiment, the compound bendable elements are arranged in the same plane with said driving means connected as defined above.

Various methods for driving said suspension systems are possible including but not limited to: rotary stepper motor and friction drive systems, rotary stepper motor and taut band drive systems, and rack and pinion drive systems.

The foregoing and other objects, features and advantages of the invention will be apparent from the following more particular description of the invention as illustrated in the accompanying drawings.

DETAILED DESCRIPTION OF THE INVENTION

Figure 1:
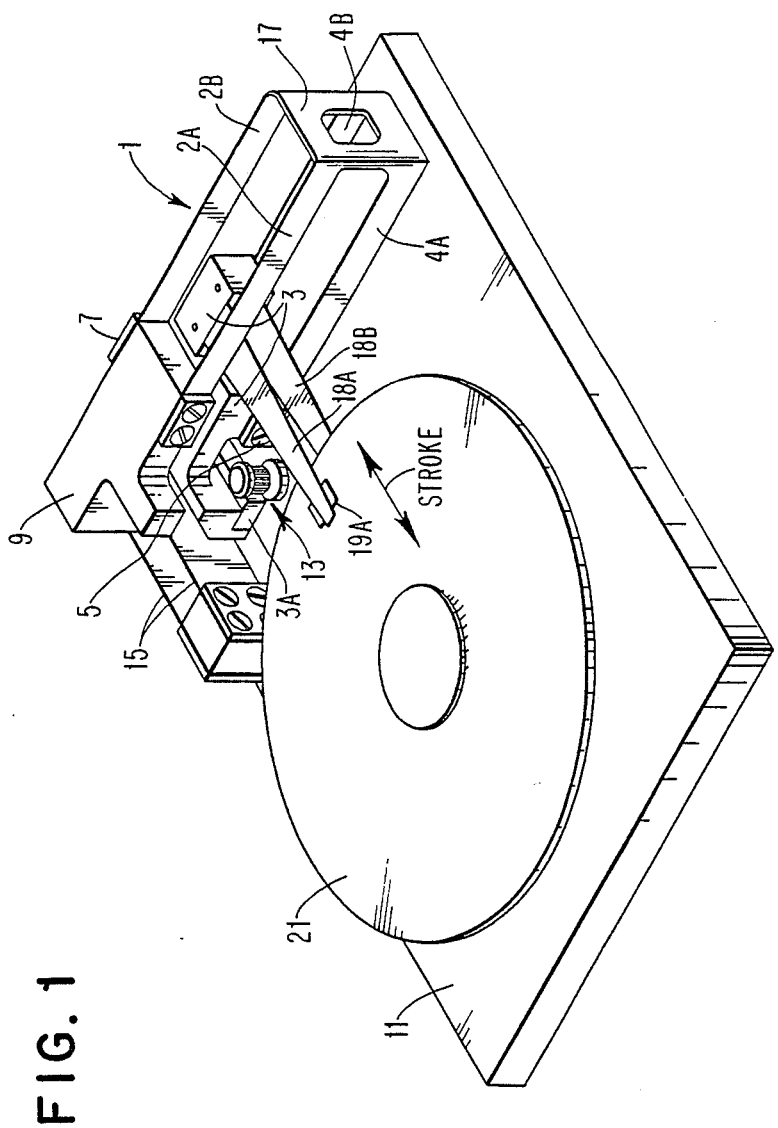
FIGS. 1–3 are isometric and top views of a linear translation apparatus according to the present invention incorporating a bi-planar compound spring assembly and a rotary stepper motor with a frictional drive.

FIG. 1 is an isometric view of a typical data recording arrangement wherein the read/write head assembly actuating means comprises a compound spring system with a rotary stepper motor and frictional drive means.

The configuration and constructions of those elements (i.e. read/write heads, disks, flexure etc.) common to the various embodiments of the subject invention are of conventional design and materials. Therefore, the disks will be recognized as rotatable storage mediums of any of a variety of embodiments depending on the specific type of data recording desired. The read/write heads and/or the air bearing head/slider are operationally located adjacent to said disk and suspended from a flexure arm suspension which is designed to move in a linear translation motion for reading and recording from track to track on said recording medium. Common terms, describing like elements as recognized by one skilled in the art will be used interchangeably herein.

Referring now to FIG. 1, the portions of the linear translation mechanism there shown, comprise a compound parallel leaf spring assembly 1 arranged to support a carrier mass 3 connected at end 5 thereof. The leaf spring assembly 1 is supported at its end 7 by support post 9 which is fixedly attached so as not to move in the direction of the stroke.

It should be recognized by those skilled in the art that the leaf spring assembly 1 can be configured in any of a number equivalent but different arrangements to form a compound parallel spring suspension. In the present embodiment the leaf spring assembly is shown to comprise a unitary compound spring structure joined at the connecting means 17, an integral part of the spring. However, the structure could consist of four (4) separate leaf springs, each paired set of springs being attached consistent with the spring arrangement of FIG. 1 with means 17 connecting the upper and lower spring pairs.

Continuing now with FIG. 1, the carrier mass 3 is positioned against a rotating element 13. The rotating element 13 comprises a knurled shaft attached to a stepper motor (not shown). As assembled in the FIG. 1, the knurled shaft 13 bears against the carrier mass at element 3A for establishing frictional contact thereto. In the present embodiment, element 3A is a nylon block which has been attached to the carrier mass 3. Optionally, the element 3A can be continually held in contact with the knurled shaft 13 by use of preload springs 15. The shifting of the support post 9 by said springs 15 causes loading of the element 3A into contact with the knurled shaft 13. It should be recognized by those skilled in the art that other means of loading said frictional element to said drive means are possible.

Further, extended in a cantilevered fashion from and attached to said carrier mass 3, are flexure suspension arms 18A and 18B. These flexure arms have suspended therefrom, read/write heads and/or air bearing head/sliders 19A (and 19B not shown).

In operation, the rotary motion of the stepper motor (not shown) causes the knurled shaft 13 to rotate at some incremental rate. The rotation of the knurled shaft 13 thereby drives the nylon element 3A with carrier mass 3 attached therewith in the radial direction. This displacement of the carrier mass 3 causes the translation of flexure arms 17A and 17B across the disk 21 moving the heads 19A and 19B linearly from track to track. As shown in FIG. 1 the actuator is positioned mid-stroke.

Figure 2:
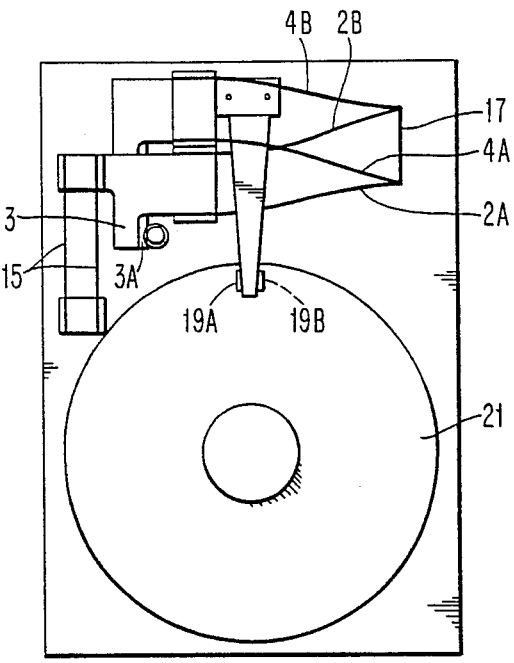

FIG. 2 is a top view of the apparatus of FIG. 1 wherein the read/write heads 19A and 19B have been positioned or driven to the outside track of the recording medium. Outside and inside track designation being recognized in the art as terms for denoting innermost (nearest spindle) tracks and outermost tracks.

In this actuated position, nylon block 3A attached to carrier mass 3 has been driven to the farthest outer limit of its travel. This change in position of the carrier mass 3 and block 3A thereby causes springs 2A and 2B and 4A and 4B to flex and displace the connecting means 17. This displacement of means 17 is in the same direction as the displacement of the carrier mass 3. However, displacement of the means 17 is a result of the equal flexure of the upper and lower springs 2A and 2B and 4A and 4B, respectively, and the means 17 is therefore only displaced ½the distance of the total linear displacement of the read/write head.

Figure 3:
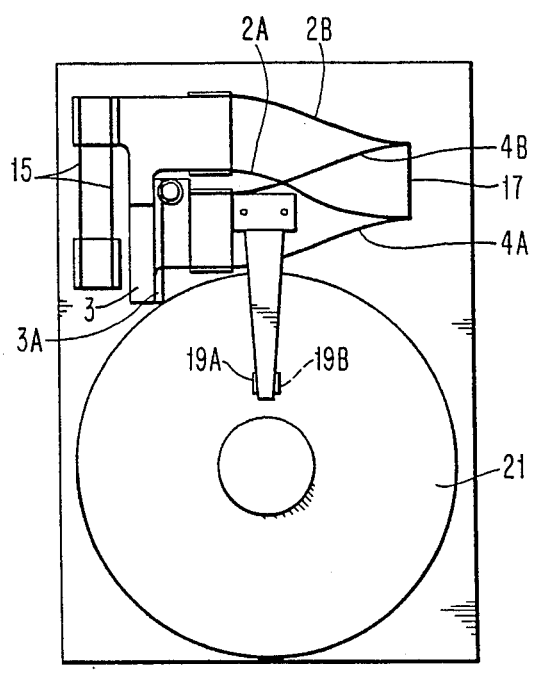

FIG. 3 is a further top view of the actuation device of FIG. 1. Now, however, the read/write heads have been positioned to the innermost track of the recording disk 21. As with FIG. 2, the connecting means 17 has now been displaced in the direction of the stroke by ½ of the total displacement distance of the read/write heads per the same bending response of the compound spring suspension of FIG. 2.

Thus, the read/write head can be moved incrementally and in a reciprocating manner from track to track on disk 21 in the direction of the stroke indicated. The flyheight of the transducer is unaffected by said spring actuation as the spring suspension is stiff and unbending in the vertical plane. Skew angle errors for the embodiment of FIGS. 1-3 have been measured to be less than 23 milliradians skew angle for a stroke of appropriately 25mm. This is significantly less than the skew angle error of a comparable swing arm actuator known in the art to be on the order of 10 degrees for a stroke 25mm.

As stated above, in an alternative frictional drive embodiment using the compound spring assembly of FIG. 1, frictional contact can be maintained by the compression of the parallel springs 2A and 2B and tension of springs 4A and 4B. This can be accomplished by offsetting the upper support platform 9 in the spring's horizontal plane.

Figure 4:
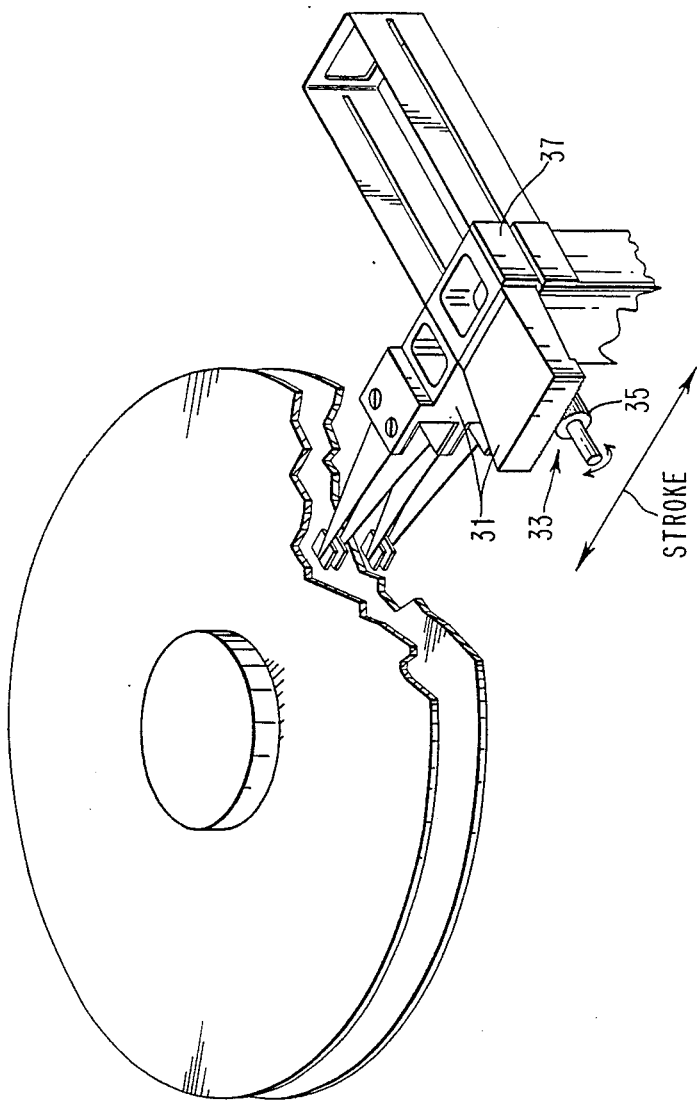
FIG. 4 is an isometric view of a linear translation apparatus according to the present invention incorporating the compound spring assembly of FIG. 1 and a rotary stepper motor with a rack and pinion drive.

Referring now to FIG. 4, there is shown an isometric view of another embodiment for the linear translation apparatus according to the subject invention. While the embodiment of FIG. 4 and spring actuation mechanism is identical to that of FIG. 1, the driving means has been changed to a rack and pinion assembly.

The carrier mass 31, now has attached thereto gear rack 33 which is loaded in the vertical direction against pinion 35 wherein pinion 35 rotates in the direction as shown and is connected to a stepper motor (not shown). Now, with rotation of pinion 35, gear rack 33 is driven horizontally in the direction of the stroke. It is noted that while in FIG. 1, the lower spring of the compound spring assembly, is attached to the driver means, in FIG. 4, it is the upper spring end 37 which is to be translated. It should be understood that the selection of translated spring end is a matter of choice, as long as the paired other end of the spring assembly remains fixed.

Figure 5:
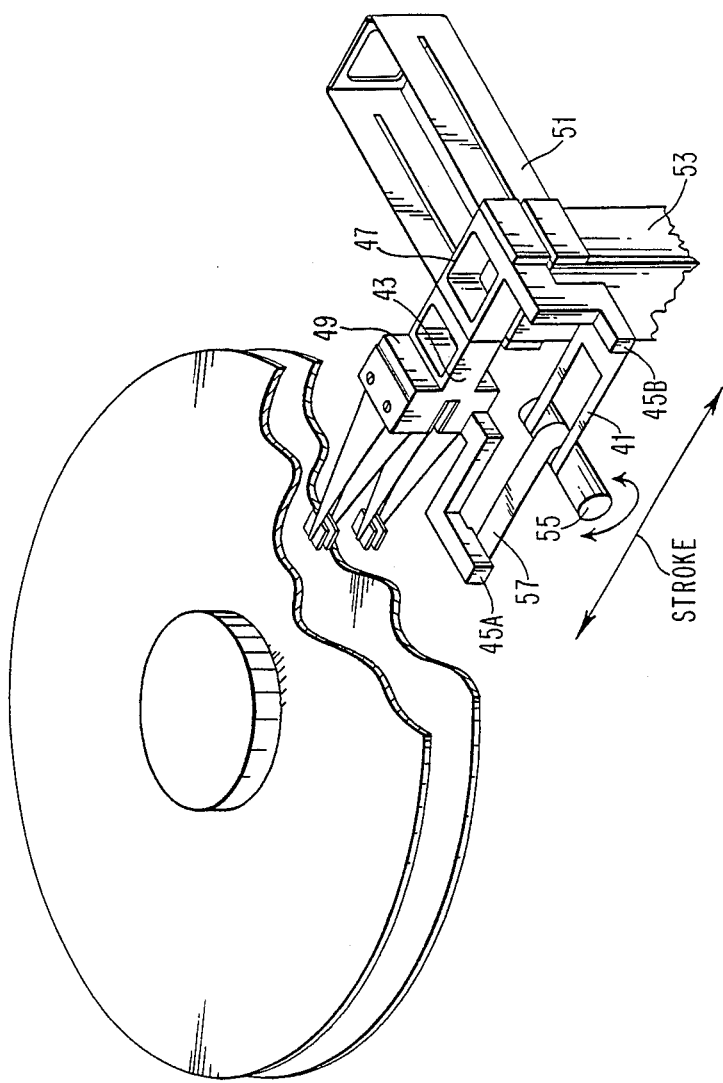
FIG. 5 is an isometric view of a linear translation apparatus according to the present invention incorporating the compound spring assembly of FIG. 1 and a rotary stepper motor and taut band drive.

FIG. 5 is an isometric view of a still further embodiment of a linear translation apparatus according to the subject invention. As in FIGS. 1 and 4 the spring actuation mechanism is the same as has been described with FIGS. 1-3.

Differently, however, the driving means has been replaced by a taut drive band assembly. Now, a drive band 41 is mounted between two posts 45A and 45B which are attached to a carrier mass 43. The carrier mass 43 now includes these posts 45A and 45B, and the spacer 47 between the upper spring pair and the blocks 49 on which the transducer assemblies are mounted. The lower spring pair 51 is attached to the post 53 and, as stated above, this is a matter of choice and can be reversed with the upper spring pair if desired. Rotation of the stepper motor (not shown) now causes rotation of band shaft 55, and winds and unwinds band 41 for linear translation of the recording transducer in the direction of the stroke indicated.

Figure 6:
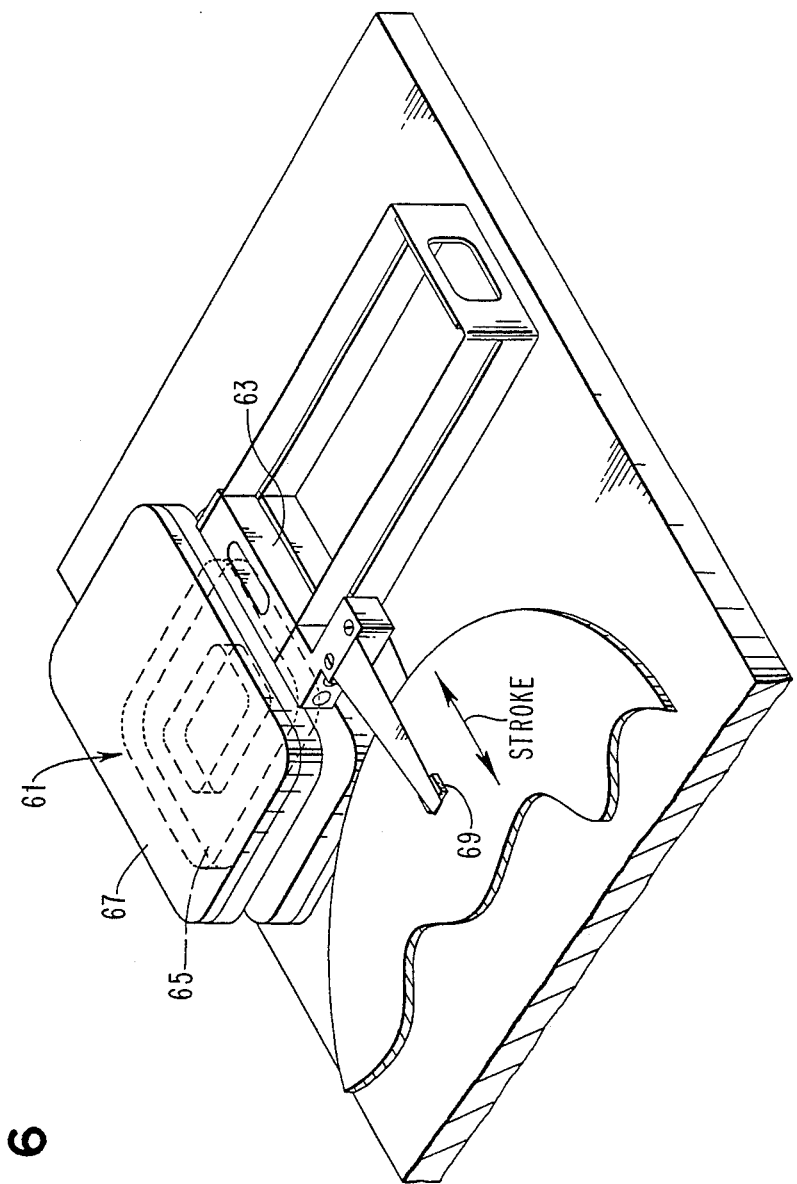
FIG. 6 is an isometric view of a linear translation apparatus according to the present invention incorporating the compound spring assembly of FIG. 1 and a voice coil motor drive.

FIG. 6 illustrates an isometric view of the preferred embodiment of the subject invention. In FIG. 6, the identical spring actuation mechanism of FIGS. 1, 4, and 5 is attached to a voice coil motor 61 which is used to translate the carrier mass 63 in a linear stroke. With this embodiment, the voice coil armature 65 is directly attached to the carrier mass. Thus, there is a virtual elimination of the frictional forces between the carrier mass 63 and the drive system 61. The drive system 61 moves the carrier mass 63 electromagnetically with no mechanical contact. As a result, the access time can be made as short as the mechanical system, comprising the springs and connecting mass, will allow for a given voice coil motor design.

It should be recognized by those skilled in the art that by voice coil motor what is meant, is a conventional voice coil actuator as known in the prior art for moving transducer heads. With such motors the magnetic stator 67 provides the field which actuator 65 utilizes to move the heads linearly. The coil current produces a force in the direction of the stroke moving armature 65 and transducer 69 in a direction commensurate therewith. By using the voice coil motor, the coil current can be made part of the servo control loop, thus providing a simple and efficient mechanism for insuring selected track registration. In addition, there are no undesirable net forces generated perpendicular to the flexure of the disk.

Figure 7:
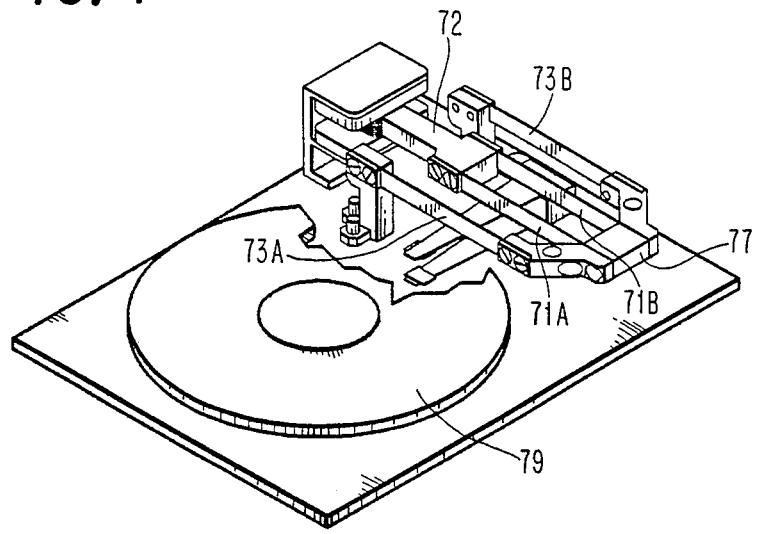
FIGS. 7–9 are isometric and top views of a linear translation apparatus according to the present invention incorporating a single plane compound spring assembly and voice coil motor drive.

FIG. 7 is an isometric view of a compound spring actuation assembly employing the identical voice coil means of FIG. 6 wherein said springs are co-planar. The apparatus as shown in FIG. 7 is similar to that apparatus of FIG. 6 except that now instead of upper and lower springs, the springs are positioned as inner springs 71A and 71B and outer springs 73A and 73B. Also, the carrier mass 72 has been extended so as to link to the voice coil armature 75. As shown in FIG. 7, the actuator is positioned mid-stroke adjacent to recording medium 79.

Figure 8:
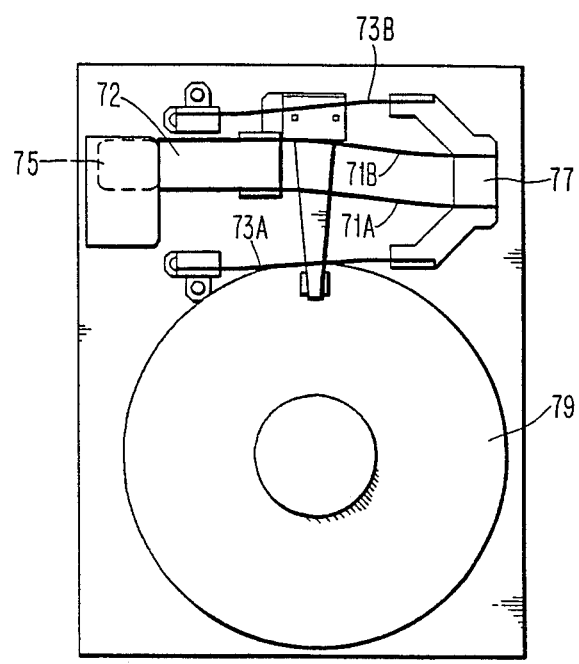

FIG. 8 is a top view of the apparatus of FIG. 7 wherein the read/write heads have been positioned or driven to the outside track of the recording medium 79. In this actuated position, armature 75 has been driven to the farthest limit of its travel. This change in position of armature 75 thereby causes springs 71A and 71B and 73A and 73B to flex and reposition with connecting means 77. This displacement of connecting means 77 is in the same direction as the displacement of the armature 75. However, the displacement of the connecting means 77 is dependent upon the equal flexure of inner and outer springs 71A and 71B and 73A and 73B, respectively. Therefore, the means 77 is only displaced by ½ the distance of the total linear displacement of the armature. It can be readily seen that the above is a result of the shortening of springs 71A and 71B, offset by the equal shortening of springs 73A and 73B.

Figure 9:
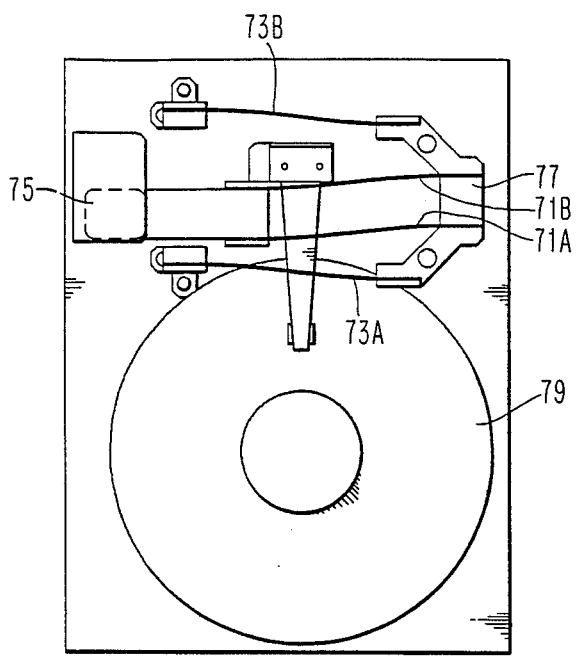

FIG. 9 is a further top view of the actuation device of FIG. 7. Now, however, the read/write heads have been driven to the innermost track of the recording medium. As with FIG. 8, the connecting means 77 has been displaced in direction of the armature 75 displacement but only for ½ of the displacement distance per the equal bending response of the compound springs 71A and 71B and 73A and 73B.

While the above embodiments have all been described using leaf springs, other bending elements are able to be used to provide spring-like action.

Figure 10:
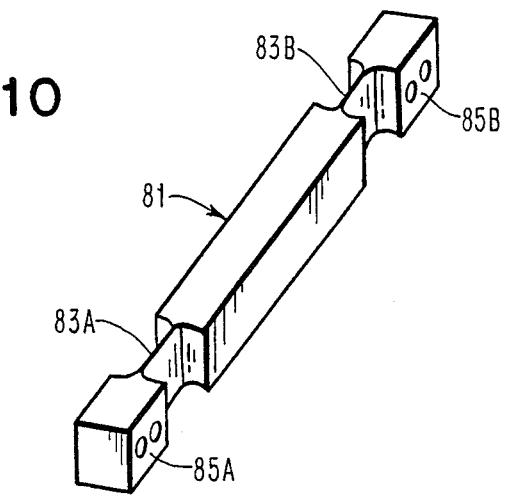
FIG. 10 is an isometric view of an alternative flexural element for the subject invention.

In FIG. 10, one type of bending element, a flexural element is shown. This flexural element has a stiff member of link 81 connected to flexural links 83A and 83B. Thus, the stiff member link 81 has at its ends thin flexural elements 83A and 83B for the spring action. Links 85A and 85B attach to flexures 83A and 83B for fixation of bendable element.

Thus, while the invention has been described with reference to preferred embodiments thereof, it will be understood by those skilled in the art that various changes in form and details may be made without departing from the scope of the invention.

Having thus described our invention, what we claim as new, and desire to secure by Letters Patent is:

1. A magnetic disk record/playback apparatus comprising:
   a support;
   a rotatable magnetizable disk on the support, said disk having a surface;
   first and second bending elements, each bending element having first and second attachment points and a length between the first and second attachment points, the length of the first bending element being substantially equal to the length of the second bending element, the first attachment points of the first and second bending elements being attached to the support at locations spaced a distance in a first direction parallel to the surface of the disk, the first attachment points of the first and second bending elements being fixed to the support relative to the rotatable disk, the first and second bending elements being bendable in the first direction, the first and second bending elements extending from the support in a second direction;
   connection means attached to the second attachment points of the first and second bending elements, said second attachment points of the first and second bending elements being attached to the connection means at locations spaced a distance in the first direction, the distance between the second attachment points of the first and second bending elements being substantially equal to the distance between the first attachment points of the first and second bending elements;
   third and fourth bending elements, each bending element having first and second attachment points and a length between the first and second attachment points, the lengths of the third and fourth bending elements being substantially equal to the lengths of the first and second bending elements, the first attachment points of the third and fourth bending elements being attached to the connection means at locations spaced a distance in the first direction, the third and fourth bending elements being bendable in the first direction, the third and fourth bending elements extending from the connection means toward the support in the second direction;
   a magnetic record/playback head assembly attached to the second attachment points of the third and fourth bending elements opposite the surface of the disk, said second attachment points being attached to the magnetic record/playback head assembly at locations spaced a distance in the first direction, the distance between the second attachment points of the third and fourth bending elements being substantially equal to the distance between the first attachment points of the third and fourth bending elements; and driving means for causing the magnetic record/playback head assembly to move in the first direction relative to the support.

2. An apparatus as claimed in claim 1, characterized in that the first, second, third, and fourth bending elements have substantially equal dimensions and substantially equal spring constants.

3. An apparatus as claimed in claim 2, characterized in that the first and second directions are substantially perpendicular to each other when there is no external force applied in the first direction to the magnetic record/playback head assembly.

4. An apparatus as claimed in claim 3, characterized in that the first, second, third, and fourth bending elements are flexures.

5. An apparatus as claimed in claim 1, characterized in that the first, second, third, and fourth bending elements have substantially equal flexure.

6. An apparatus as claimed in claim 1, characterized in that:
the magnetic record/playback head assembly is arranged at a rest position when there is no external force applied in the first direction to the magnetic record/playback head assembly; and
when the magnetic record/playback head assembly is displaced a first distance in the first direction relative to its rest position, the connection means is displaced one-half of the first distance in the first direction.

7. An apparatus as claimed in claim 6, characterized in that when the magnetic record/playback head assembly is displaced in the first direction relative to its rest position, the first, second, third, and fourth bending elements are substantially equally shortened in the second direction.

8. A magnetic disk record/playback apparatus comprising:
a support;
a rotatable magnetizable disk on the support, said disk having a surface;
first and second bending elements, each bending element having first and second attachment points and a length between the first and second attachment points, the length of the first bending element being substantially equal to the length of the second bending element, the first attachment points of the first and second bending elements being attached to the support at locations spaced a distance in a first direction parallel to the surface of the disk, the first attachment points of the first and second bending elements being fixed to the support relative to the rotatable disk, the first and second bending elements being bendable in the first direction, the first and second bending elements extending from the support in a second direction;
connection means attached to the second attachment points of the first and second bending elements, said second attachment points of the first and second bending elements being attached to the connection means at locations spaced a distance in the first direction, the distance between the second attachment points of the first and second bending elements being substantially equal to the distance between the first attachment points of the first and second bending elements;
third and fourth bending elements, each bending element having first and second attachment points and a length between the first and second attachment points, the lengths of the third and fourth bending elements being substantially equal to the lengths of the first and second bending elements, the first attachment points of the third and fourth bending elements being attached to the connection means at locations spaced a distance in the first direction, the third and fourth bending elements being bendable in the first direction, the third and fourth bending elements extending from the connection means toward the support in the second direction;
a magnetic record/playback head assembly attached to the second attachment points of the third and fourth bending elements opposite the surface of the disk, said second attachment points being attached to the magnetic record/playback head assembly at locations spaced a distance in the first direction, the distance between the second attachment points of the third and fourth bending elements being substantially equal to the distance between the first attachment points of the third and fourth bending elements, said magnetic record/playback head assembly being arranged at a neutral position when there is no external force applied in the first direction to the magnetic record/playback head assembly; and
means for displacing the magnetic record/playback head assembly in the first direction relative to the support to bring the magnetic record/playback head assembly to rest at a position displaced in the first direction relative to the neutral position.

9. An apparatus as claimed in claim 8, characterized in that the first, second, third, and fourth bending elements have substantially equal dimensions and substantially equal spring constants.

10. An apparatus as claimed in claim 8, characterized in that the first and second directions are substantially perpendicular to each other when there is no external force applied in the first direction to the magnetic record/playback head assembly.

11. An apparatus as claimed in claim 8, characterized in that the first, second, third, and fourth bending elements have substantially equal flexure when the record/playback head assembly is displaced from the neutral position.

12. An apparatus as claimed in claim 8, characterized in that when the magnetic record/playback head assembly is displaced a first distance in the first direction relative to its neutral position, the connection means is displaced one-half of the first distance in the first direction.

13. An apparatus as claimed in claim 8, characterized in that when the magnetic record/playback head assembly is displaced in the first direction relative to its neutral position, the first, second, third, and fourth bending elements are substantially equally shortened in the second direction.

* * * * *